United States Patent [19]

Vaupel et al.

[11] Patent Number: 4,518,286
[45] Date of Patent: May 21, 1985

[54] SYSTEM FOR PUMPING SUSPENDED PARTICLES UPWARD

[75] Inventors: Knut Vaupel; Peter Schulz, both of Essen, Fed. Rep. of Germany

[73] Assignee: Bergwerksverband GmbH, Essen, Fed. Rep. of Germany

[21] Appl. No.: 462,899

[22] Filed: Feb. 1, 1983

[30] Foreign Application Priority Data

Feb. 3, 1982 [DE] Fed. Rep. of Germany ....... 3203578

[51] Int. Cl.³ .............................................. B65G 53/30
[52] U.S. Cl. ....................................... 406/46; 406/125
[58] Field of Search .................. 406/46, 93, 106, 124, 406/146, 125; 366/177; 137/3

[56] References Cited

U.S. PATENT DOCUMENTS

| | | | |
|---|---|---|---|
| 2,726,137 | 12/1955 | Davis, Jr. .......................... | 406/46 X |
| 3,612,615 | 10/1971 | Allen .................................... | 406/125 |
| 4,047,644 | 9/1977 | Raymond .......................... | 406/62 X |
| 4,114,954 | 9/1978 | Pasieka .................................. | 406/93 |

FOREIGN PATENT DOCUMENTS 1239236  4/1967  Fed. Rep. of Germany .
2625513 12/1977  Fed. Rep. of Germany .

*Primary Examiner*—Jeffrey V. Nase
*Assistant Examiner*—Larry Williams
*Attorney, Agent, or Firm*—Karl F. Ross; Herbert Dubno

[57] ABSTRACT

A slurry of solid particles suspended in water or some other liquid is elevated in a riser tube, extending upward from a closed vessel, under hydraulic pressure from the same liquid descending into the vessel from a hydrostatic column whose height is less than that of the riser tube; liquid exiting at the top of that tube is recirculated to the vessel through the column after being freed from the accompanying solids. The excess height of the riser tube is made possible by the admission of bubbles of air or some other gas into the tube at its lower end. Fresh particles to be entrained by the rising liquid are fed into the closed vessel via a gated conduit maintaining the hydrostatic pressure therein.

4 Claims, 2 Drawing Figures

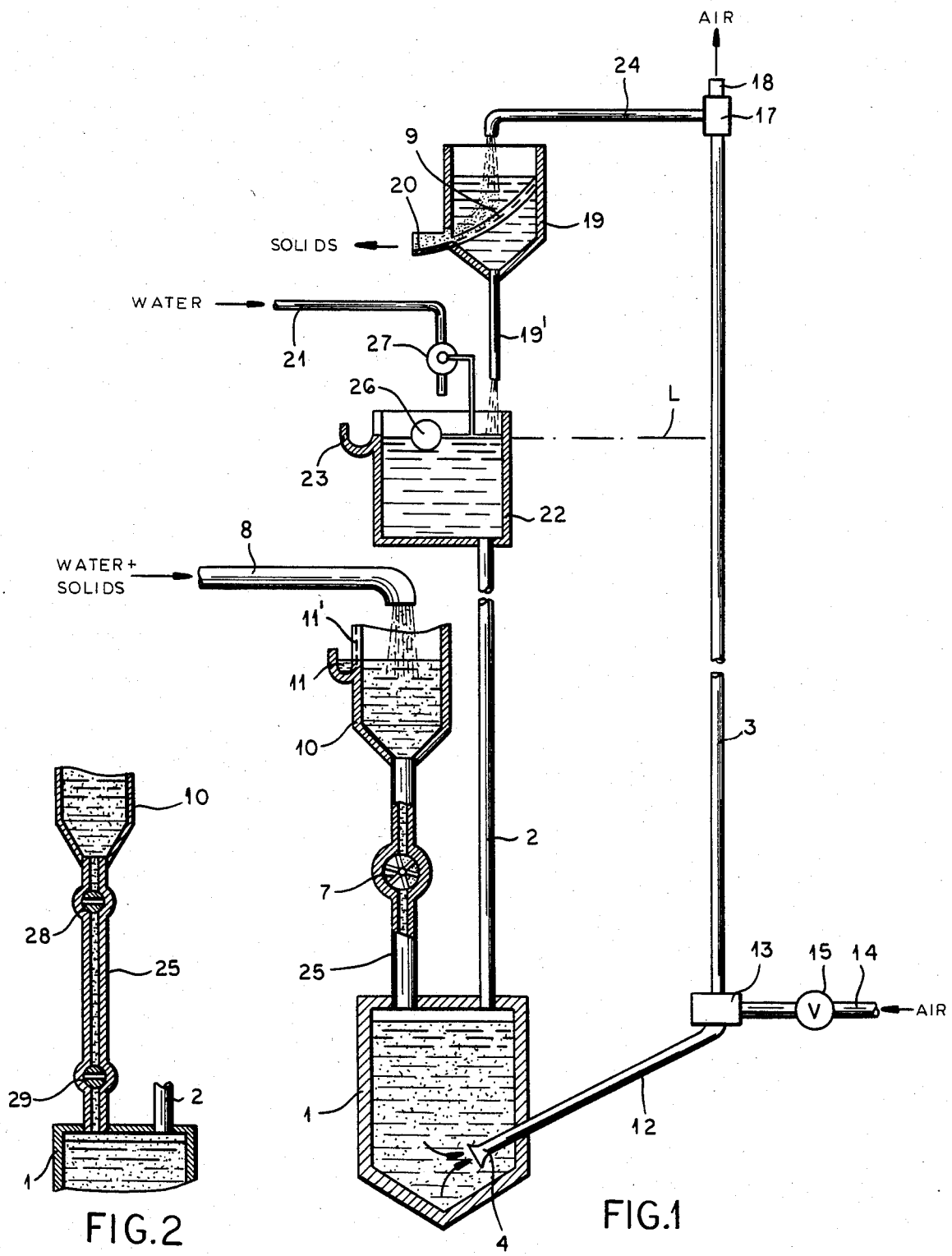

SYSTEM FOR PUMPING SUSPENDED PARTICLES UPWARD

FIELD OF THE INVENTION

Our present invention relates to a pumping system for the fluidic elevation of solid particles, in the form of a slurry, from a lower to an upper level.

BACKGROUND OF THE INVENTION

Systems of this character, known in the trade as mammoth pumps, include two intercommunicating conduits, namely a first and a second tube, which are used to create a pressure differential with the aid of bubbles of air or some other gas injected into the second or riser tube near the foot thereof in order to reduce the specific weight of its contents. Thus, a slurry or other liquid containing solid particles can be introduced from above into the shorter first tube to descend therein while acting as a hydrostatic column letting the same slurry, lightened by the introduced gas bubbles, ascend in the longer second tube to the top of the latter for transportation of the particles to the higher level. This type of system is generally utilized for the conveyance of finely comminuted material such as activated charcoal from an adsorber bed to a regenerator from which that material is subsequently returned to the bed. The utilization of a slurry has the advantage of minimizing the abrasion undergone by the particles during transportation.

In large installations, such as clearing plants for the purification of waste water, the difference in elevation between the pick-up level and the discharge level of the conveyed particles often has to be greater than that available with the conventional pumping system described. The extent to which the second or riser tube can project above the top of the first or descending tube, forming the hydrostatic column, is determined by the proportion of the injected gas which must be kept low enough to preserve the abrasion-minimizing effect of the slurry; the height of the second tube, in fact, can never by more than twice that of the first one. To satisfy the requirement for a large level difference, therefore, a considerable overdimensioning of the conduits—also taking into account the increased flow resistance—would be required.

OBJECT OF THE INVENTION

Thus, the object of our present invention is to provide an improved pumping system of the general type referred to in which particles can be fluidically elevated over larger level differences without the need for such overdimensioning of conduits.

SUMMARY OF THE INVENTION

We have found, in accordance with our invention, that this object can be realized with the aid of a vessel which is closed to the atmosphere and forms the junction between the descending and ascending first and second tubes, this vessel being also connected to a hopper for the solids to be conveyed which are fed thereto via a conduit provided with gating means to prevent a backflow of the liquid from the vessel and to maintain that liquid under the hydrostatic pressure of the column present in the first tube; the latter, therefore, contains only the liquid used for the transportation of the particles. Some liquid, however, advantageously accompanies also the solids incoming from the hopper, thereby enabling a positive-acting slurry pump to be used as the gating means. Preferably, pursuant to a more particular feature of our invention, the liquid separated from the entrained solids after exiting from the top of the riser tube is returned to the top of the descending tube for recirculation, together with whatever make-up liquid is necessary as a compensation for losses occurring along the path.

BRIEF DESCRIPTION OF THE DRAWING

The above and other features of our invention will now be described in detail with reference to the accompanying drawing in which:

FIG. 1 is a diagrammatic elevational view, partly in section, of a pumping system embodying our invention; and FIG. 2 is a fragmentary view showing a partial modification of that system.

SPECIFIC DESCRIPTION

In FIG. 1 we have shown a closed vessel 1 communicating, via three ports, with the bottom end of a descending tube 2, the entrance end of an extension 12 of a riser tube 3 and the bottom end of a pipe 25, the latter serving as a conduit for the supply of a slurry consisting of solid particles (e.g. activated charcoal) and water. The slurry is fed through a duct 8 to the open top of a hopper 10 provided with an overflow trough 11 for excess liquid filtered out through a screen 11'. The solids and the remaining liquid are advanced intermittently into the vessel 1 by a slurry pump 7, designed as a rotating cylinder with sectoral compartments, which forms a one-way gate maintaining at all times a fluidic separation between the upper and lower parts of conduit 25. An open-topped tank 22, connected to the upper end of tube 2, is filled with water to a certain level L which is held constant by an overflow trough 23 and a float 26 controlling a valve 27 in a supply conduit 21. The water forms a hydrostatic column inside tube 2 and also insures that the vessel 1 is always completely filled with liquid in addition to the solids admitted through conduit 25. The aqueous suspension of solid particles in vessel 1 is forced into the extension 12 of tube 3 by the hydraulic pressure prevailing in that vessel, namely the weight of the water present in tank 22 and tube 2; this pressure is only partly counterbalanced by the weight of a mixture of solids, water and air in riser tube 3 whose specific gravity is less than that of water alone. The air bringing about this weight difference is admitted through a tube 14, at a rate controlled by a valve 15, into a joint 13 connecting the tube 3 with its extension 12. Thereby the slurry is able to rise to the top of tube 3, lying well above level L, where the entrained air escapes at an outlet 18 of another joint 17 which links the tube 3 with a tube 24 delivering the slurry to a separator 19. The solid particles are filtered out in that separator by a curved screen 9 from which they are discharged by way of a chute 20 to a nonillustrated receiver such as a regenerator working into an absorber bed. Most of the accompanying water is returned by an outlet 19' of separator 19 to the tank 22 for recirculation through the system of communicating conduits represented by tubes 2, 3, 12 and vessel 1. Losses of water are made up by a fresh supply via conduit 21.

In FIG. 2 we have shown a modified arrangement where the slurry pump 7 in conduit 25 has been replaced by a pair of cascaded shut-off valves, namely an upstream valve 28 just below hopper 10 and a downstream valve 29 just above vessel 1. In operation, the two valves are opened alternately during nonoverlapping periods so that the contents of hopper 10 are partly emptied into conduit 25 via valve 28, closure of that valve being followed by an opening of valve 29 to let the solids descend into vessel 1.

In a specific instance, in which the water level L at the overflow 23 of tank 22 lay 7.2 meters above joint 13 and 2.8 meters below joint 17, the volumes of vessel 1, hopper 10, tank 22 and conduit 25—measured between valves 28 and 29 of FIG. 2—were 20, 15, 20 and 10 liters, respectively. Tubes 2 and 3 had respective internal diameters of 32 and 15 mm while valves 28 and 29 had passages with a diameter of 40 mm. The system was used for the transportation of activated charcoal with a mean particle diameter of 1.6 mm and a bulk weight of about 400 grams/liter. The suspension fed to hopper 10 moved at a rate of 110 liters/hour, the solids being fed at 60 liters/hour. After a sufficient amount of solids had accumulated in hopper 10, valve 28 was opened to let the particles pass into conduit 25 whereupon this valve was closed and valve 29 was opened until all the particles had sunk into vessel 1. This procedure was repeated ten times per hour. The solids, at the aforementioned rate of 60 liters/hour, traveled together with 90 liters/hour of water from tube 2 into tube 12 for admixture at joint 13 with about 1.5 m$^3$ air per hour at 20° C. and 1 bar gauge pressure; the air entered the slurry in the form of finely distributed bubbles and escaped from tube 3 into the atmosphere at outlet 18. The abrasive effect of the transportation upon the particles was not greater than with known systems.

According to the conventional procedure, the solids to be transported would have to be fed into the tank 22 at level L rather than, pursuant to our invention, at the substantially lower level of hopper 10. The latter level was only about 1.6 meters above that of joint 13, corresponding to a reduction of substantially 4.5:1 with the dimensions given above.

As will be apparent from the foregoing example, the gas (air) introduced at the joint 13 is under a pressure exceeding only slightly the countervailing hydrostatic pressure in the riser tube 3. This contrasts with systems of the mammoth-pump type in which solids such as coal are hoisted with the aid of high-pressure air without any backflow-preventing gating devices, e.g. as described in an article on pages 690 and 691 of the German publication FÖRDERN UND HEBEN, Vol. 9, 1963. That type of system, requiring large amounts of air delivered by a compressor, is not satisfactory for the transportation of delicate particles (e.g. of activated charcoal) because of the substantial wear to which the solids are subjected by the entering air stream itself as well as during their travel in the riser tube. Such particle wear is also unavoidable in purely hydraulic systems in which the solids are introduced directly into a relatively rapid flow of confined liquid, e.g. under penumatic pressure as described in U.S. Pat. No. 3,612,615 by a reciprocating piston according to German Pat. No. 1,239,236 or with a push-pull mechanism pursuant to German laid-open specification No. 26 25 513. In contrast, the solid material fed into the vessel 1 of our present system enters a nearly quiescent body of liquid and is accompanied only by enough water to prevent a clogging of the supply conduit 25.

We claim:

1. A system for fluidically elevating solid particles from a lower level to an upper level, comprising:
    a vessel closed against the atmosphere;
    a first tube extending upward from the top of said vessel and containing a liquid which forms therein a hydrostatic column of given height;
    a second tube with an inlet end at said vessel and with an outlet end at a level substantially above that of said vessel;
    a conduit at a level substantially below that of said outlet end loadable with solid particles to be entrained by said liquid through said second tube, said conduit being provided with gating means preventing a backflow of said liquid and maintaining the hydrostatic pressure of said column in said vessel; and
    a source of gas communicating with said second tube near said inlet end for injecting bubbles into a slurry which is formed by said liquid and said particles and which enters said second tube from said vessel through said inlet end, thereby reducing the specific weight of said slurry sufficiently to let same rise to said outlet end.

2. A system as defined in claim 1 wherein said gating means comprises a positive-acting slurry pump.

3. A system as defined in claim 1, further comprising separating means connected to said outlet end for removing entrained particles from said liquid and returning at least part of said liquid to an upper end of said first tube for recirculation to said vessel, said second tube having a height substantially exceeding that of said first tube.

4. A system as defined in claim 3 wherein said upper end forms an open-topped container communicating with a supply of make-up liquid and provided with overflow means for maintaining the height of said column substantially constant.

* * * * *